United States Patent [19]

Jackson

[11] Patent Number: 4,580,610

[45] Date of Patent: Apr. 8, 1986

[54] TIRE

[75] Inventor: William L. Jackson, Sutton Coldfield, England

[73] Assignee: Dunlop Limited, London, England

[21] Appl. No.: 433,102

[22] Filed: Oct. 6, 1982

[30] Foreign Application Priority Data

Oct. 9, 1981 [GB] United Kingdom ............... 81 30592

[51] Int. Cl.[4] ......................... B60C 15/02; B60C 7/24; B60C 15/06

[52] U.S. Cl. .................................... 152/516; 152/450; 152/539; 152/543; 152/548; 152/541; 152/543; 152/544; 152/553; 152/379.3

[58] Field of Search ........ 152/330 RF, 352 R, 352 A, 152/354 R, 362 R, 362 LS, 374, 379.3, 356 R

[56] References Cited

U.S. PATENT DOCUMENTS

| 803,510 | 10/1905 | Sankey | 152/362 R |
|---|---|---|---|
| 903,714 | 11/1908 | Hawley et al. | 152/362 R |
| 1,375,527 | 4/1921 | Miegel | 152/362 R |
| 1,435,667 | 11/1922 | Schultz | 152/362 R |
| 1,482,240 | 1/1924 | Marquette | 152/362 R |
| 1584554 | 2/1981 | GBX . | |
| 1,682,922 | 9/1928 | McKone | 152/362 R |
| 1,966,397 | 7/1934 | Sohl | 152/362 R |
| 2,874,747 | 2/1959 | Woodall | 152/362 R |
| 3,974,870 | 8/1976 | Watts | 152/361 R |
| 4,148,348 | 4/1979 | French et al. | 152/362 R |

FOREIGN PATENT DOCUMENTS

| 1480921 | 3/1969 | Fed. Rep. of Germany ... 152/362 R |
| 1124766 | 10/1956 | France ............................. 152/362 R |
| 1480917 | 7/1977 | United Kingdom ............ 152/362 R |
| 1584553 | 2/1981 | United Kingdom |
| 1584554 | 2/1981 | United Kingdom |

Primary Examiner—Lois E. Boland
Attorney, Agent, or Firm—Stevens, Davis, Miller & Mosher

[57] ABSTRACT

A tire, which may be pneumatic or non-pneumatic, having beads which are each provided with an elastic annular member axially and radially inwardly of the associated bead core. The carcass ply is wrapped axially outwards of the bead core and part of the annular member.

The tire bead seat has a taper angle which is greater than that of the rim bead seat such that on fitment of the tire to the rim the annular member, and the associated edge of the ply rotate around the bead core and cause the carcass ply to be placed in tension.

11 Claims, 9 Drawing Figures

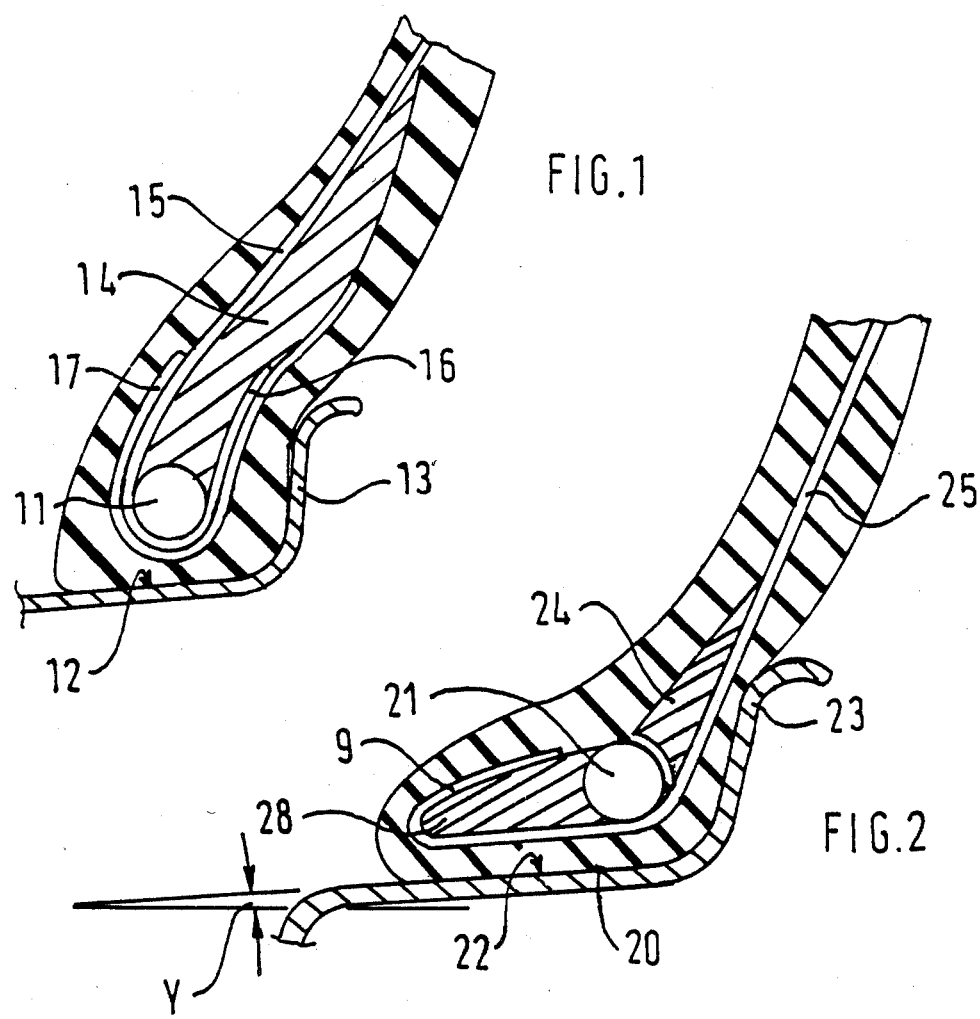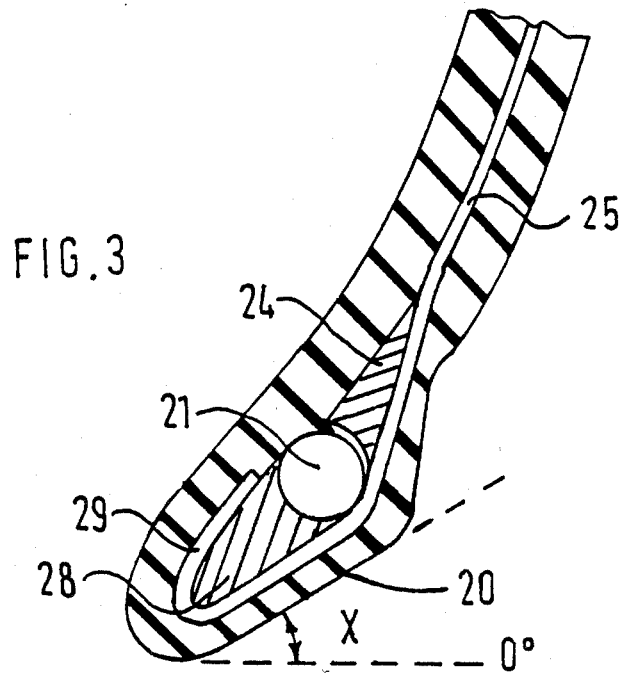

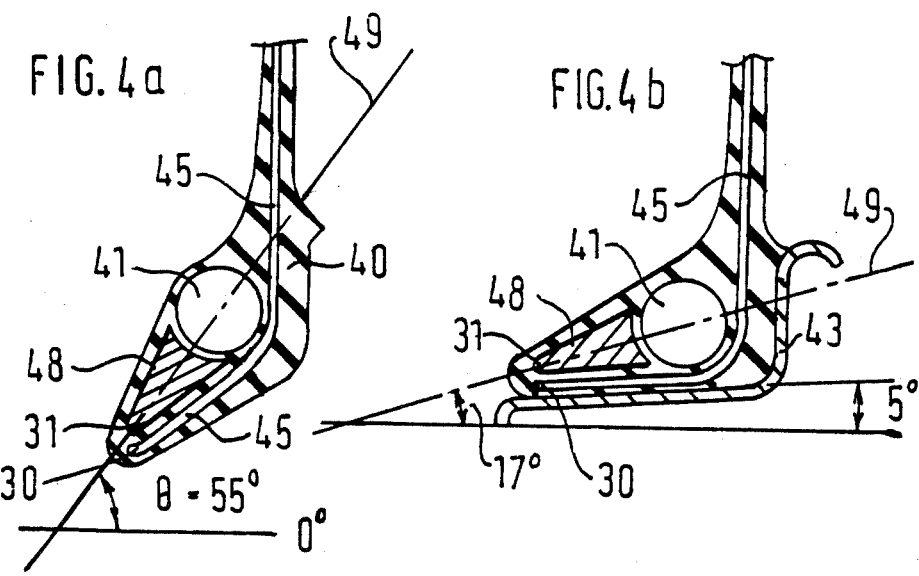
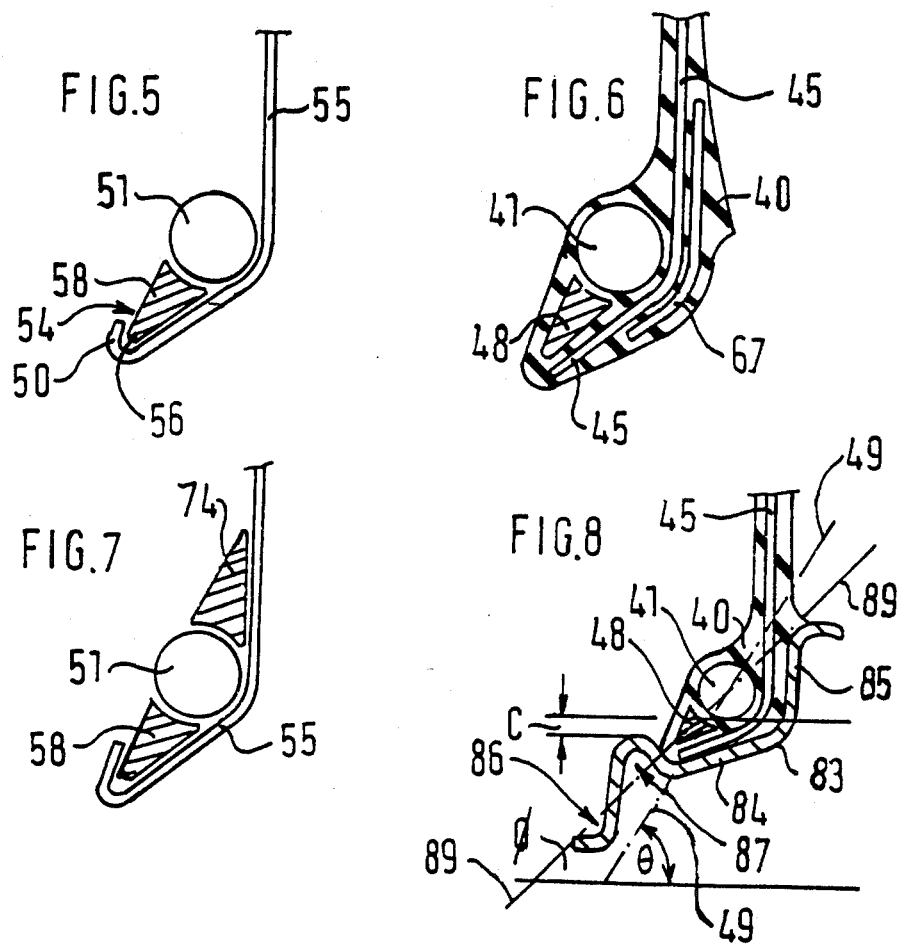

TIRE

This invention relates to tires, and particularly but not exclusively to tires for the wheels of motorised road vehicles, e.g. cars and trucks.

Tires are known which comprises a tread, two sidewalls, a pair of annular bead cores, a carcass consisting of at least one carcass ply of rubberized cord fabric having its end portions wrapped radially around the bead cores from the interior of the tire towards the exterior, so as to form respective ply turn-ups, each turn-up being positioned on the respective axially outwards side of the carcass ply. Usually when such tires are moulded, but not yet mounted on a wheel rim, the two bead cores are spaced apart by an axial distance which is slightly greater than the distance between the two bead cores when the tire is mounted on a wheel rim. It is also customary to provide for a greater interference fit between the toe of the tire's bead and the rim bead seat than the interference fit between the heel and the rim bead seat, for the purpose of improving air sealing in tubeless tires. On mounting the tire on its rim there is a tendency therefore for the ply turn-up to become slightly unwrapped from around its bead core due to a small amount of bead rotation arising from the bead core spacing and the differential interference fits, and thus for the carcass ply between the two bead cores to become slack. Such resulting slack may reduce the reinforcing effect of the carcass ply. This slackening effect is particularly disadvantageous in tires having sidewalls which are substantially straight when considered in cross-section, and which extend substantially perpendicularly to the tread.

It is an object of the present invention to provide a tire in which the above disadvantageous effect is obviated or mitigated.

In accordance with the invention a tire comprises a tread, two sidewalls, two beads each comprising an inextensible bead core, a rubberized carcass ply, and two elastically extensible annular members, each said annular member being associated with a respective bead core and positioned axially and radially inwards of the respective bead core substantially in contact therewith, each edge portion of the carcass ply being wrapped axially outwards of part of the periphery of the bead core and at least part of the surface of its associated annular member to form a ply edge-wrap. (The term "ply edge-wrap" as used in this specification means that portion of the edges of the carcass ply or plies which are wrapped at least partially around a bead core and its associated member; a ply edge-wrap of the present invention corresponds, in terms of carcass ply edge anchoring, to a ply turn-up in a prior art tire of the kind described above and hereafter illustrated in FIG. 1).

Preferably the annular member is of a rubber composition which may be harder than the surrounding rubber composition. The length of contact (when considering a cross-section of the tire in a plane including the axis of rotation of the tire) between the ply edge-wrap and the bead core plus the associated annular member must be sufficient adequately to anchor the carcass ply to the bead core and the associated annular member, and fully to withstand tension forces existing in the carcass ply. This length of contact is affected by many factors, e.g. the mutual adherence properties of the carcass ply and the annular member, the size and type of tire, the inflation pressure (if any), and the magnitudes of the static and dynamic loads intended to be applied in use to the tire.

Preferably a protective layer e.g. a chafer strip is provided adjacent the tire bead core to reduce or prevent damage caused by the chafing of the tire against the wheel rim in use. A reinforcing layer may be wrapped around the bead core and annular member outwardly of the carcass ply to form such a protective layer.

If the tire is pneumatic (i.e., air-inflated in normal use), the load-bearing properties arise from the tension forces in the carcass ply which are created when the tire is inflated. However, it is possible to have a non-pneumatic tire i.e. a tire in which the internal air pressure is equal to atmospheric pressure, wherein tension forces in the carcass ply are created solely by means of the structure of the tire and/or of associated components.

A tire in which the carcass tension forces are created by internal air pressure has the disadvantage that the vehicle-supporting function of the tire may be almost completely destroyed if a puncture occurs. Conversely, a tire in which the carcass tension forces are not created by internal air pressure, will not suffer from this disadvantage.

It is a further, more limited, object of the present invention to provide a tire in which the carcass tension forces are created either partially or wholly by means other than internal air pressure.

Thus according to a more limited aspect of the present invention a tire comprises a tread, two sidewalls, two inextensible bead cores, a rubberized carcass ply, and two elastically extensible annular members, each said annular member being associated with a respective bead core and being positioned radially and axially inwardly of the respective bead core substantially in contact therewith, each edge portion of the carcass ply being wrapped axially outwards of part of the periphery of the bead core and at least part of the surface of its associated annular member to form a ply edge-wrap, such that the operation of fitting the tire to a wheel rim causes each said annular member to rotate axially inwardly and radially outwardly about the associated bead core to a position substantially wholly inwardly of said bead core whereby said rotation causes the carcass ply to be placed in tension.

Alternatively, also according to a more limited aspect of the invention, a tire comprises a tread, two sidewalls, two inextensible bead cores, two bead seating surfaces each radially inwards of a respective bead core, a rubberized carcass ply, and two elastically inextensible annular members, each said annular member being associated with a respective bead core and positioned axially inwards of the respective bead core substantially in contact therewith, each edge portion of the carcass ply being wrapped axially outwards of part of the periphery of the bead core and at least part of the surface of its associated annular member to form a ply edge-wrap, each said bead seating surface being of substantially conically tapered form and having an angle of taper substantially greater than the angle of taper of the substantially conical bead seat on the wheel rim to which the tire is to be fitted for use whereby when the tire is fitted to said rim each ply edge-wrap is rotated axially inwardly and radially outwardly about the bead core and the carcass ply is thereby placed in tension.

Another aspect of the invention provides a tire and wheel rim assembly, the tire being in accordance with any of the preceding aspects of the invention, and the wheel rim to which a tire of the present invention is fitted for use has a continuous circumferential hump or a plurality of circumferentially spaced-apart humps axially inwards of each rim bead seat, against which the axially inner extremity of each bead abuts when the tire is fitted on the rim; or alternatively, in place of said humps, the wheel rim may have a circumferentially continuous groove at the axially inner edge of each rim bead seat, the axially and radially inner edge of each tire bead being extended so as to fill the respective groove when the tire is fitted to the rim.

Embodiments of the invention will now be described by way of examples only with reference to the accompanying drawings in which:

FIG. 1 shows a cross-section through one bead region of a tire mounted on part of a wheel rim, said tire not being in accordance with the invention;

FIG. 2 shows a cross-section through one bead region of a first embodiment of a tire in accordance with the invention and mounted on part of a wheel rim;

FIG. 3 shows a cross-section of said one bead region of the tire shown in FIG. 2 in the as-moulded state before being mounted on the wheel rim;

FIGS. 4(a) and 4(b) show a cross-section through one bead region of a second embodiment of a tire in accordance with the invention, respectively before and after mounting on a wheel rim;

FIGS. 5, 6 and 7 show cross-sections through one bead region of third, fourth and fifth embodiments respectively of tires in accordance with the invention; and FIG. 8 shows a cross-section through one bead region of the second embodiment of tire mounted on a wheel rim in accordance with the invention.

(It should be noted that all of the illustrated cross-sections are taken on a plane including the axis of rotation of the respective tires).

The prior art tire having a bead region such as shown in FIG. 1 is a typical radial-ply tire having a tread (not shown), a reinforcing breaker (not shown) radially inwards of the tread, a carcass reinforced by means of a single carcass ply 15 consisting of radially extending rubberized cords, each edge of the carcass ply 15 being wrapped around a bead core 11 and extending axially and radially outwards of the bead core 11 to form a ply turn-up 16. (Only one carcass ply edge and one bead core are shown in FIG. 1). Radially outwards of each bead core 11 is a hard rubber apex strip 14. A bead reinforcing strip or chafer strip 17 is wrapped around the carcass ply turn-up 16 and the lower part of the apex strip 14 to act as a protective layer protecting the bead from chafing against the wheel rim. The reinforcing strip 17 comprises a rubberized parallel cord fabric the cords of which extend at an angle of substantially 60° to the mid-circumferential plane of the tire and cross the cords of the carcass ply 15 which are inclined at substantially 90° to the mid-circumferential plane. The cords of the carcass ply 15 and of the reinforcing strip 17 may be of steel or rayon or any other suitable tire cord material.

In FIG. 1 the tire is mounted on a wheel rim having two spaced-apart rim flanges 13 immediately axially inwards of which are two bead seating surfaces 12. (Only one rim flange and one bead seating surface are shown in FIG. 1).

The tire which is a first embodiment of the invention has two bead regions one of which is shown in cross-section in FIGS. 2 and 3, and is also a radial-ply tire comprising a tread (not shown), a reinforcing breaker (not shown) radially inwards of the tread, two sidewalls, and a carcass reinforced by means of a single carcass ply 25 comprising radially extending rubberized cords. Each edge of the carcass ply 25 is wrapped around a respective bead core 21 of substantially circular cross-section from the exterior side of the bead core 21 towards the interior of the tire (i.e. in a direction opposite to the ply edge-wrap or turn-up direction of the typical prior-art tire as shown in FIG. 1). The cords of the carcass ply 25 may be of steel or rayon or any other suitable tire cord material.

In the as-moulded state, the tire is as shown in FIG. 3. An annular member 28 is provided radially and axially inwards of each bead core 21, the annular member 28 being formed of a rubber composition which is harder than that of the rubber surrounding the carcass ply 25. The annular member 28 is of elongated tapering form when considered in cross-section, having a width adjacent the bead core 21 substantially equal to the diameter of the bead core 21. The end of the annular member 28 further from the bead core 21 is rounded, and less wide than the other, axially and radially outer end of the annular member 28 which is in abutting contact with the bead core 21. However the member may be separated from the tension-resisting elements of the bead core 21 by a relatively thin surface coating of rubber on the bead core 21. An apex strip 24 of hard rubber is provided radially outwards of the bead core 21. Each edge portion of the carcass ply 25 is wrapped in a direction from the tire exterior towards the tire interior around part of the periphery of the bead core 21 and most of the surface of the annular member 28 to form a ply edge-wrap 29 which lies axially inwards of the carcass ply 25 in the radially inner part of the sidewall and terminates on the radially outer and axially inner surface of the annular member 28. One or more additional reinforcing strips (not shown) may be provided adjacent each bead core 21 e.g. around the carcass ply 25 and its edge-wrap 29, or closer to the outer surface of the tire as a protective layer(s) to prevent damage due to chafing between the tire and the wheel rim 23.

As can be seen in FIG. 3 a substantially conical tire bead seating surface 20 is provided radially inwards of the bead core 21. This surface 20 is tapered with an angle X e.g. 30° which is much steeper than the angle of taper Y of the substantially conical seating surface 22 of the wheel rim 23 as shown in FIG. 2. Typically Y has a value of 5°.

During the operation of mounting the tire on the wheel rim 23 the engagement of the tire bead seating surface 20 with the corresponding rim bead setting surface 22 causes the annular member 28, the ply edge-wrap 29 and the surrounding part of the tire bead to be rotated axially inwardly and radially outwardly around the bead core 21 (i.e. clockwise as viewed in FIGS. 2 and 3) thus causing the carcass ply 25 to be placed in tension.

A second embodiment of a tire in accordance with the invention is diagrammatically illustrated with reference to FIGS. 4a and 4b each of which show, in cross-section, a bead region taken on a plane including the axis of rotation of the tire. FIG. 4a shows the bead region before the tire is fitted to a rim, and FIG. 4b the same bead region after such fitment. The bead region of this second embodiment is generally similar to the first embodiment (FIGS. 2 and 3) in essential respect, and comprises an inextensible bead core 41, an annular member 48 of elastically extensible material (e.g. rubber of a suitable hardness or any other suitable material), and a radial carcass ply 45 of rubberized cord material (e.g. steel or high-strength textile) the cords of which extend at substantially 90° to the mid-circumferential plane of the tire (i.e. the cords of the carcass ply 45 lie substantially in the plane of the drawing). The annular member 48 is of similar shape to the annular member 28 shown in FIG. 3, i.e. the annular member 48 is a ring with a cross-sectional shape which is substantially triangular, the base of this triangle being relatively narrow compared to the other two sides of the triangle, and the relatively narrow base being substantially in contact with the bead core 41, having a small separation therefrom (exaggerated in the drawing) due to a thin coating of rubber on the bead core 41. The carcass ply 45 is wrapped around the adhered to an axially outer part of the periphery of the bead core 41 and to the radially inner surface of the annular member 48. (For clarification the ply, bead core and member are shown separated in FIGS. 4a and 4b). The extent of the ply edge-wrap in this second embodiment of the tire according to the invention is such that the edge 30 of the carcass ply 45 is located substantially at the apex 31 i.e. the radially and axially innermost extremity, of the annular member 48 with the tire in its as-moulded and unfitted shape as shown in FIG. 4(a).

The above-described assembly of the bead core 41, the annular member 48 and the carcass ply 45 is embedded in rubber compound 40 which is moulded and cured to the desired profile of the finished tire. It will be noted from FIG. 4(a) that the sidewalls of this second embodiment of tire and in particular, the part of the carcass ply 45 within and reinforcing the sidewalls extends substantially purely radially since this tire is of the "straight-sidewall" type intended to be capable of use without inflation. For this purpose, the tread region (not shown) is braced by a substantially rigid breaker assembly (not shown) located radially outwardly or more preferably radially inwardly of the carcass ply 45, and supported by a substantial pre-tension in sidewall portions of the carcass ply 45. This pre-tension is produced by arranging that in the as-moulded and unmounted state of the tire as shown in FIG. 4(a), an imaginary line 49 throughout the centre of the bead core 41 and the apex 32 of the annular member 48 subtends an angle $\theta$ of the order of 55° with respect to the axis of rotation of the tire, i.e. an angle which is much greater than the angle of inclination of any rim bead seat on which such a tire may be fitted. As a consequence of such high inclination of the line 49, the inextensibility of the bead core 41, the extensibility of the annular member 48, and an adequately strong adherence of the edge of the carcass ply 45 to the annular member 48, the fitting of the tire onto a wheel rim 43 with standard 5° bead seat taper as shown in FIG. 4(b) causes clockwise rotation of the bead assembly, including axially inward and radially outward elastic extension of the annular member 48. Such rotation and extension of the annular member 48 around the inextensible bead core 41 causes the imaginary line 49 to reduce its inclination from about 55° in the as-moulded and unmounted condition (FIG. 4(a)) to about 17° with respect to the axis of rotation of the tire when fully mounted on the wheel rim 23 with the beads correctly seated on the wheel bead seats (FIG. 4(b)). Such rotation also causes the adhered edge-wrap of the carcass ply 41 to undergo the same movement, resulting in a substantial tension being produced in the sidewall portions of the carcass ply 45. In a car tire of typical size, the arrangement of FIG. 4(a) and 4(b) would wind about 3 mm of carcass ply around the inextensible bead core, causing an extension of about 3% in the sidewall carcass reinforcing cords and thus generating a pre-tension of the same order as the inflation stresses in a normal prior-art tire. This sidewall tension is resisted and sustained by the afore-mentioned breaker assembly, with the pretensioned and substantially straight sidewalls enabling improved performance of the tire in respect of load capacity and comfort, and also in respect of ability to run without inflation pressure. The advantages obtainable with tires having sidewalls with minimal curvature is more fully set out in U K Patent Specification No. 1 576 409.

The angle $\theta$ need not be 55° as illustrated, but could be any other suitable angle greater than the angle of the bead seats; for example, $\theta$ could be lower than 55° or higher and possibly up to 90° greater than the bead seat angle, i.e. $\theta$ could be up to 95° for use with 5° rim bead seats.

FIG. 5 shows a bead region assembly, without encasing rubber, which is similar to the assembly of FIG. 4(a), and comprises an inextensible bead core 51, an extensible annular member 58 shaped and positioned similarly to the annular member 48 of FIG. 4(a), and a carcass ply 55 wrapped around part of the periphery of the bead core 51 and securely adhered to the radially inner surface of the annular member 58. A principal difference of the FIG. 5 arrangement compared to the FIG. 4(a) arrangement lies in the edge 50 of the carcass ply 51 being wrapped around the apex 56 of the annular member 58 to terminate about one quarter of the way across the axially inner and radially outer surface 54 of the annular member 58, for increased adherence of the carcass ply to the annular member compared to the FIG. 4(a) arrangement. This is intended to illustrate that the extent of the ply edge-wrap is a matter of design choice to secure adequate adhesion, and that the extent of the ply edge-wrap does not affect the fundamental scope of the invention.

The tire and bead assembly arrangements of FIGS. 3, 4(a) and 5 may be modified without departing from the scope of the invention by increasing the number of carcass plies from the single one illustrated in each of these embodiments, to two or more carcass plies (not shown). In such modifications incorporating two or more carcass plies, the reinforcing cords thereof preferably all extend at substantially 90° to the mid-circumferential plane of the tire though alternatively the ply cords may be inclined at angles less than 90°, down to about 75° and preferably mutually crossing in adjacent plies, and the edges of each carcass ply are preferably all wrapped around the respective bead cores and annular members from the exterior of the tire towards the interior of the tire (as for each illustrated single-ply case). The extent of the ply edge-wrap may in each case be the same or different for each of the plurality of carcass plies in a given tire, provided adherence of the plies to the annular members is adequate in each instance to withstand subsequent tension forces in the respective sidewalls.

FIG. 6 illustrates a modification of the arrangement of FIG. 4(a), wherein prior to being embedded the rubber compound 40, the bead assembly of the bead core 41, the annular member 48 and the carcass ply 45 has a protective layer or chafer strip 67 of rubberised cord fabric applied to the exterior surface or heel region of the bead assembly. The layer 67 serves to protect the bead assembly and in particular, to protect the substantially pre-tensioned carcass ply 45 from damage due to chafing against a wheel rim, particularly the rim flange, when the tire is mounted on a wheel and in use on a vehicle. The addition of a protective layer of chafer strip as illustrated by way of example in FIG. 6 does not affect the basic structure and principles of the present invention, and merely illustrated one of several ways in which the tires of the present invention may be modified without altering the basic scope of the invention.

FIG. 7 illustrates a modification of the bead assembly of FIG. 5, wherein the tire bead region additionally incorporates an apex strip 74 of suitably hard rubber for the purpose of stiffening the radially inner regions of the sidewalls in the bead region.

FIG. 8 illustrates the tire of FIG. 4(a) (or a tire very similar thereto) mounted on a special wheel rim 83. The tire and wheel assembly is another facet of the present invention. The wheel rim 83 (of which only one lateral extremity is shown in radial cross-section in FIG. 8, the wheel rim 83 being laterally symmetrical) has conically tapered bead seats 84 inclined in this example at about 20° to the axis of rotation of the tire and wheel rim assembly, but which may have other suitable inclinations, e.g. 0° or 5° or 15°. The laterally outside edges of the bead seats 84 are bounded by rim flanges 85. The central region of the rim 82 is formed with a tire-fitting well 86. Between the well 86 and the bead seats 84, the rim 83 is formed with humps 87 which are preferably circumferentially continuous around the rim 83, but which may alternatively be formed as a number of circumferentially discontinuous sectors. The external diameters of the humps 87 are greater than the diameters of the axially inner edges of the bead seats 84 but less than the diameters of the radially innermost parts of the bead cores 41 by a radial clearance distance "C".

The tire of FIG. 8 is moulded so that before fitting on a wheel rim, the imaginary centre line 49 through the centre of the bead core 41 and the apex 31 of the annular member 48 forms an angle $\theta$ with the axis of rotation of the tire and wheel assembly (or with any line parallel thereto) such that $\theta$ is substantially greater than the likewise measured 20° angle of the bead seats 84, $\theta$ being about 59° in the FIG. 8 example; $\theta$ may have any other suitable angular value.

In order to fit the FIG. 8 tire on the wheel rim 83, the tire is first manipulated onto the rim so that both tire beads rest in the rim well 86. The beads are then simultaneously or consecutively forced axially outwards over the respective humps 87, in each bead the respective clearance distance "C" measured radially inwardly of the inextensible bead core 41 and the elastic deformability of the other parts of the bead allowing sufficient deformation of the bead, particularly including radially outward extension of the toe region, as to allow the bead to pass radially over the hump 87 in the course of axially directed movement outwards from the well 86 until the hump 87 has been fully traversed. When each bead has fully passed over the respective hump 87, a relatively small radially inward rotation of the respective bead assembly takes place around the respective bead core 41, and each bead will then drop into its fully seated position on the respective rim bead seat 84 with the respective bead toe abutting the laterally outward edge of the respective one of the humps 87. (This radially inward rotation of the bead assembly when relaxing onto its bead seat is anti-clockwise rotation for the bead assembly illustrated in FIG. 8, but would be clockwise rotation for the unillustrated bead at the other or left side of the tire). Such abutment of bead toe and rim hump as shown in FIG. 8 will retain the tire beads upon their respective rim bead seats against dislodgement forces of substantial magnitude, such as for example would be caused by use of the tire without inflation on a vehicle undergoing hard cornering at speed. Thus the arrangement of FIG. 8, in particular the shape of the wheel rim 83 in conjunction with a selected one of the previously described tires with bead assemblies in accordance with the invention (the FIG. 4(a) tire being chosen for this example), constitutes a practicable and effective bead retention system for run-flat tire and wheel rim assemblies.

While the structure of the assembly illustrated in FIG. 8 produces a bead retention function additional to the sidewall carcass ply tension producing function of the previous embodiments of the present invention, the latter function is still effected in the arrangement of FIG. 8. With the tire in its fully fitted position on the wheel rim 83 as shown in FIG. 8, an imaginary line 89 drawn through the centre of the bead core 41 and the apex of the annular member 48 is inclined at an angle $\phi$ to the axis of rotation of the tire and wheel rim assembly (or to any line parallel to this axis). The line 89 for the fitted shape of the tire corresponds to the line 49 for the unfitted shape of the tire. The angle $\phi$ is clearly smaller than the angle $\theta$, the angle $\phi$ having a value of about 46° compared with the value of about 59° for the angle $\theta$. The amount by which the angle $\phi$ is less than the angle $\theta$, i.e. $\theta - \phi$, which is approximately 13°, is the angle by which the annular member 48 and the edge-wrap of the carcass ply 45 is rotated axially inwardly and radially outwardly about the bead core 41, and hence a measure of the tension induced in the sidewall portions of the carcass ply 45. The sidewall tension helps retain the bead toe firmly on the rim bead seat and this improves resistance to dislodgement of the beads. The angle $\phi$ is the difference between the angle of line 49 and the angle of inclination of the tire bead seat (see FIG. 4(a)), the latter angle also being the angle of the rim bead seat 84 when the tire is fully fitted on the wheel rim 83 (see FIG. 8), the angle $\phi$ possible being modified from the value measurably from FIG. 4(a) by an amount dependent on differential compression-induced deformations of the heel and toe regions of the tire bead seat when rim-fitted. Thus the angle $\phi$ is substantially dependent upon the as-moulded shape of the tire bead and also upon the angle of the wheel rim bead seat, both these angles being capable of predetermination by design. The angle $\theta$ is also capable of predetermination by design of the tire mould shape. Thus the tension induced in the sidewall portions of the cracass ply, which is dependent on the angular difference $\theta - \phi$, is capable of being substantially predetermined by design, and is most readily variable by changing the angle $\theta$ though being also variable by changing other parameters, for example bead cross-sectional peripheral shape, bead component hardnesses, and/or rim bead seat inclination.

Although various alternative embodiments of the invention have been exemplified above with reference to the accompanying drawings, the present invention is not restricted thereto and other modifications and variations are possible within the scope of the invention. For example, a wheel rim and tire assembly in accordance with the invention may be similar to the FIG. 8 arrangement, except that in place of the humps 87, the wheel rim 83 may be provided with a circumferentially continuous groove at the axially inner edge of each rim bead seat 84 and the axially and radially inner edge of each tire bead be extended so as to fill the respective groove when the tire is fully fitted on such a grooved rim, as described for example in United Kingdom Patent Specification Nos. 1 584 553 and 1 584 554. The so-formed rim groove and extended toe bead retention arrangement will have the advantage of enhanced retention of the toe extension in the rim groove due to compression from the annular member in the bead.

What is claimed is:

1. A tire and a wheel rim having a pair of annular bead seats which are each tapered axially and radially inwardly toward the center of the rim, said tire comprising a tread, two sidewalls, and two beads for contact with said rim bead seats when mounted thereon, said tire beads each comprising a seating surface having prior to mounting on the rim, an angle of taper substantially greater than the angle of taper of the rim bead seat, an inextensible bead core assembly, a rubberized carcass ply, and an elastically extensible annular member located axially and radially inwards of each bead core assembly to form an axially and radially projecting extended toe portion of each tire bead, each edge portion of the carcass ply in the vicinity of each bead core assembly extending generally from the outside of the tire to the interior thereof around the axially outer side of the bead core assembly and radially inwards of the associated annular member, the arrangement being such that upon mounting of the tire on the wheel rim the extended toe portion will rotate in an axially inward direction about the bead core assembly thereby tensioning the carcass ply.

2. A tire according to claim 1 wherein the annular member is of a rubber composition.

3. A tire according to claim 2 wherein the rubber composition of the annular member is harder than the surrounding rubber composition.

4. A tire according to claim 1 wherein the angle of taper of the tire bead seat is 25° greater than the angle of taper of the rim bead seat.

5. A tire according to claim 1 wherein the angle between the tire axis and an imaginary conical surface through the centre of the bead core and the radially inner extremity of the annular member is up to 90°.

6. A tire according to claim 1 wherein the angle between the tire axis and an imaginary conical surface through the centre of the bead core and the radially inner extremity of the annular member is 55°.

7. A tire according to claim 1 wherein the annular member is of elongated tapering form when considered in cross-section, the wider part of the member being substantially in contact with bead core.

8. A tire according to claim 1 wherein the ply edge-portion extends around the radially and axially inner extremity of the annular member.

9. A tire according to claim 1 wherein a protective layer is provided adjacent the bead core.

10. A tire according to claim 9 wherein the protective layer comprises a reinforcing layer around the bead core and annular member outwardly of the carcass ply.

11. A tire according to claim 1 wherein the means provided for causing rotation of the edge portion causes each said annular member to rotate axially inwardly and radially outwardly about the associated bead core to a position substantially wholly inwardly of said bead core whereby said rotation causes the carcass ply to be placed in tension.

* * * * *